US008453936B2

(12) United States Patent
Johnson et al.

(10) Patent No.: US 8,453,936 B2
(45) Date of Patent: Jun. 4, 2013

(54) SWITCHABLE RADIATION ENHANCEMENT AND DECOUPLING (75) Inventors: Daniel Robert Johnson, Farnborough (GB); Paul Richard Clarke, Farnborough (GB); Christopher Robert Lawrence, Farnborough (GB); James Robert Brown, Farnborough (GB); William Norman Damerell, Farnborough (GB); Richard James Duncombe, Farnborough (GB)

(73) Assignee: OMNI-ID Cayman Limited, Grand Cayman (KY)

( * ) Notice: Subject to any disclaimer, the term of this patent is extended or adjusted under 35 U.S.C. 154(b) by 563 days.

(21) Appl. No.: 12/519,109

(22) PCT Filed: Dec. 13, 2007

(86) PCT No.: PCT/GB2007/004778
§ 371 (c)(1),
(2), (4) Date: Jul. 7, 2010

(87) PCT Pub. No.: WO2008/071971
PCT Pub. Date: Jun. 19, 2008

(65) Prior Publication Data
US 2011/0037541 A1    Feb. 17, 2011

(30) Foreign Application Priority Data
Dec. 14, 2006    (GB) .................................. 0624915.5

(51) Int. Cl.
*G06K 19/06*    (2006.01)
(52) U.S. Cl.
USPC ............ 235/492; 343/745; 343/842; 343/851

(58) Field of Classification Search
USPC ............................ 235/492; 343/745, 842, 851
See application file for complete search history.

(56) References Cited

U.S. PATENT DOCUMENTS

| 2,990,547 | A | 6/1961 | McDougal |
| 3,065,752 | A | 11/1962 | Potzl |
| 4,242,685 | A | 12/1980 | Sanford |
| 4,498,076 | A | 2/1985 | Lichblan |
| 4,714,906 | A | 12/1987 | D'Albaret et al. |
| 4,728,938 | A | 3/1988 | Kaltner |

(Continued)

FOREIGN PATENT DOCUMENTS

| EP | 0512491 | 11/1992 |
| EP | 0548851 | 12/1992 |

(Continued)

OTHER PUBLICATIONS

Hibbins, et al., "Squeezing Millimeter Waves into Microns", Physical Review Letters, vol. 92, No. 14, 2004.

(Continued)

*Primary Examiner* — Kristy A Haupt
(74) *Attorney, Agent, or Firm* — McDonnell Boehnen Hulbert & Berghoff LLP (57) ABSTRACT

A device capable of enhancing an electric field to drive an electromagnetic tag into operation is switchable between states to control operation of the tag. Enhancement is provided by a dielectric cavity structure defined between first and second conducting layers. Different states of the device may have different resonant frequencies and read ranges according to the characteristics of the enhancement. As such a container can be provided which includes a tag which switches states on opening, allowing improved tracking characteristics.

31 Claims, 5 Drawing Sheets

U.S. PATENT DOCUMENTS

| | | | |
|---|---|---|---|
| 4,835,524 A | 5/1989 | Lamond et al. |
| 4,890,111 A | 12/1989 | Nicolet et al. |
| 5,276,431 A | 1/1994 | Piccolli et al. |
| 5,285,176 A | 2/1994 | Wong et al. |
| 5,557,279 A | 9/1996 | D'Hont |
| 5,565,875 A | 10/1996 | Buralli et al. |
| 5,677,698 A | 10/1997 | Snowdon |
| 5,682,143 A | 10/1997 | Brady et al. |
| 5,949,387 A | 9/1999 | Wu et al. |
| 5,973,600 A | 10/1999 | Mosher, Jr. |
| 5,995,048 A | 11/1999 | Smithgall et al. |
| 6,049,278 A | 4/2000 | Guthrie et al. |
| 6,072,383 A | 6/2000 | Gallagher, III et al. |
| 6,118,379 A | 9/2000 | Kodukula et al. |
| 6,121,880 A | 9/2000 | Scott et al. |
| 6,130,612 A | 10/2000 | Castellano et al. |
| 6,147,605 A | 11/2000 | Vega et al. |
| 6,172,608 B1 | 1/2001 | Cole |
| 6,208,235 B1 | 3/2001 | Trontelj |
| 6,229,444 B1 | 5/2001 | Endo et al. |
| 6,239,762 B1 | 5/2001 | Lier |
| 6,265,977 B1 | 7/2001 | Vega et al. |
| 6,271,793 B1 | 8/2001 | Brady et al. |
| 6,285,342 B1 | 9/2001 | Brady et al. |
| 6,307,520 B1 | 10/2001 | Liu |
| 6,339,406 B1 | 1/2002 | Nesic et al. |
| 6,366,260 B1 | 4/2002 | Carrender |
| 6,456,228 B1 | 9/2002 | Granhed et al. |
| 6,483,481 B1 | 11/2002 | Sievenpiper et al. |
| 6,507,320 B2 | 1/2003 | Von Stein et al. |
| 6,509,880 B2 | 1/2003 | Sabet et al. |
| 6,516,182 B1 | 2/2003 | Smith et al. |
| 6,552,696 B1 | 4/2003 | Sievenpiper et al. |
| 6,642,898 B2 | 11/2003 | Eason |
| 6,646,618 B2 | 11/2003 | Sievenpiper |
| 6,812,893 B2 | 11/2004 | Waterman |
| 6,816,380 B2 | 11/2004 | Credelle et al. |
| 6,825,754 B1 | 11/2004 | Rolin |
| 6,911,952 B2 | 6/2005 | Sievenpiper et al. |
| 6,914,562 B2 | 7/2005 | Forster |
| 6,944,424 B2 | 9/2005 | Henrich et al. |
| 6,946,995 B2 | 9/2005 | Choi et al. |
| 7,075,437 B2 | 7/2006 | Bridgelall et al. |
| 7,212,127 B2 | 5/2007 | Jacober et al. |
| 7,225,992 B2 | 6/2007 | Forster et al. |
| 7,298,343 B2 | 11/2007 | Forster et al. |
| 7,315,248 B2 | 1/2008 | Egbert |
| 7,768,400 B2 | 8/2010 | Lawrence et al. |
| 7,880,619 B2 | 2/2011 | Brown et al. |
| 2001/0036217 A1 | 11/2001 | Kopf et al. |
| 2002/0130817 A1 | 9/2002 | Forster et al. |
| 2002/0167500 A1 | 11/2002 | Gelbman |
| 2002/0170969 A1 | 11/2002 | Bridgelall |
| 2002/0175873 A1 | 11/2002 | King et al. |
| 2002/0177408 A1 | 11/2002 | Forster et al. |
| 2003/0112192 A1 | 6/2003 | King et al. |
| 2003/0169204 A1 | 9/2003 | Saito |
| 2003/0197613 A1 | 10/2003 | Hernandez et al. |
| 2004/0020036 A1 | 2/2004 | Arneson et al. |
| 2004/0111338 A1 | 6/2004 | Bandy et al. |
| 2004/0201522 A1 | 10/2004 | Forster |
| 2005/0012616 A1 | 1/2005 | Forster |
| 2005/0030201 A1 | 2/2005 | Bridgelall |
| 2005/0092845 A1 | 5/2005 | Forster et al. |
| 2005/0107092 A1 | 5/2005 | Charych |
| 2005/0151699 A1 | 7/2005 | Eastin |
| 2005/0200539 A1 | 9/2005 | Forster et al. |
| 2006/0028344 A1 | 2/2006 | Forster |
| 2006/0033609 A1 | 2/2006 | Bridgelall |
| 2006/0043198 A1 | 3/2006 | Forster |
| 2006/0049947 A1 | 3/2006 | Forster |
| 2006/0055542 A1 | 3/2006 | Forster et al. |
| 2006/0086808 A1 | 4/2006 | Appalucci et al. |
| 2006/0145927 A1 | 7/2006 | Choi et al. |
| 2006/0220866 A1 | 10/2006 | Dixon et al. |
| 2006/0220869 A1 | 10/2006 | Kodukula et al. |
| 2006/0261950 A1 | 11/2006 | Arneson et al. |
| 2007/0007342 A1 | 1/2007 | Cleeves et al. |
| 2007/0285907 A1 | 12/2007 | Nishikawa et al. |
| 2008/0129625 A1 | 6/2008 | Svensson et al. |
| 2010/0045025 A1 | 2/2010 | Cote et al. |
| 2010/0230497 A1 | 9/2010 | Brown et al. |
| 2011/0121079 A1 | 5/2011 | Lawrence et al. |

FOREIGN PATENT DOCUMENTS

| | | |
|---|---|---|
| EP | 1018703 | 7/2000 |
| EP | 1055943 | 11/2000 |
| EP | 1280231 | 1/2003 |
| EP | 1533867 | 5/2005 |
| EP | 1538546 | 6/2005 |
| EP | 1548629 | 6/2005 |
| EP | 1548639 | 6/2005 |
| GB | 2428939 | 2/2007 |
| JP | 63 151101 | 6/1988 |
| JP | 08-084013 | 3/1996 |
| JP | 2004054337 | 2/2004 |
| JP | 2004164055 | 6/2004 |
| JP | 2005-094360 | 4/2005 |
| JP | 2005191705 | 7/2005 |
| JP | 2005-271090 | 10/2005 |
| JP | 2005-303528 | 10/2005 |
| JP | 2006157905 | 6/2006 |
| JP | 2006-311239 | 11/2006 |
| WO | WO 98/43217 | 10/1998 |
| WO | WO 99/49337 | 9/1999 |
| WO | WO 00/05674 | 2/2000 |
| WO | WO 00/21031 | 4/2000 |
| WO | WO 00/23994 | 4/2000 |
| WO | WO 00/43952 | 7/2000 |
| WO | WO 02/07084 | 1/2002 |
| WO | WO 02/07496 | 1/2002 |
| WO | WO 02/099764 | 12/2002 |
| WO | WO 03/038747 | 5/2003 |
| WO | WO 03/090314 | 10/2003 |
| WO | WO 03/092119 | 11/2003 |
| WO | WO 03/096478 | 11/2003 |
| WO | WO 2004/025554 | 3/2004 |
| WO | WO 2004/093242 | 10/2004 |
| WO | WO 2004/093246 | 10/2004 |
| WO | WO 2004/093249 | 10/2004 |
| WO | WO 2004/097731 | 11/2004 |
| WO | WO 2004/102735 | 11/2004 |
| WO | WO 2005/045755 | 5/2005 |
| WO | WO 2005/048181 | 5/2005 |
| WO | WO 2006/006898 | 1/2006 |
| WO | WO 2006/009934 | 1/2006 |
| WO | WO 2006/044168 | 4/2006 |
| WO | WO 2006/060324 | 6/2006 |
| WO | WO 2006/105162 | 10/2006 |
| WO | WO 2007/000578 | 1/2007 |
| WO | WO 2007/144574 | 12/2007 |
| WO | WO 2008/071971 | 6/2008 |
| WO | WO 2008/075039 | 6/2008 |
| WO | WO 2008/078089 | 7/2008 |

OTHER PUBLICATIONS

Otomi et al., "Expansion of RFID-tag Reading Distance with Polarized Wave Conversion Adaptor", The 2004 Kansai-Chapter Joint Convention of Institute of Electrical Engineering, Japan, Collection of Lecture Articles, Nov. 2004.

SWITCHABLE RADIATION ENHANCEMENT AND DECOUPLING

BACKGROUND OF THE INVENTION (1) Field of the Invention

This invention relates to the local manipulation of electromagnetic fields, and more particularly, but not exclusively, to the use of switchable devices to allow RF (radio frequency) tags to be mounted in proximity to a metallic surface, and to be activated or deactivated as required.

(2) Description of the Art

Electronic devices which can interact with incident electromagnetic radiation, and emit a signal that can be detected by an appropriate reader are widely used for the identification and tracking of items, particularly for articles in a shop or warehouse environment. Such devices, which will be referred to throughout this specification as EM tags or RFID tags or simply as tags, usually comprise a chip coupled to an integral antenna which is tuned to a particular frequency of operation. The frequency of operation of current EM tags is generally radio frequencies (RF), including the ultra high frequency (UHF) and microwave ranges but the present invention is applicable to a tag which operates at any frequency. The tags may be passive, in that they interact with incident radiation of the appropriate frequency and re-transmit a modulated signal back to a reader, or active in which the tag contains its own power source.

One commonly experienced disadvantage with such tags, especially passive tags, is that if directly placed on (or within a several millimeters of) a metal surface their read range is decreased to unacceptable levels and—more typically—the tag cannot be read or interrogated. This is because a propagating-wave RF tag uses an integral antenna to receive the incident radiation: the antenna's dimensions and geometry dictate the frequency at which it resonates, and hence tailor the frequency of operation of the tag (typically 866 MHz or 915 MHz for a UHF (ultra-high frequency) range tag and 2.4-2.5 GHz or 5.8 GHz for a microwave-range tag). When the tag is placed near or in direct contact with a metallic surface, the tag's conductive antenna interacts with that surface, and hence its resonant properties are degraded or—more typically—negated. Therefore the tracking of metal articles such as cages or containers is very difficult to achieve with UHF RF tags and so other more expensive location systems have to be employed, such as GPS.

UHF RFID tags also experience similar problems when applied to certain other surfaces which interact with RF (radio frequency) electromagnetic waves, such as, certain types of glass and surfaces which possess significant water content, examples including certain types of wood with a high water or sap content. Problems will also be encountered when tagging materials which contain/house water such as, for example, water bottles, drinks cans or human bodies etc.

One way around this problem is to place a foam spacer, or mounting between the RF tag and the surface, preventing interaction of the antenna and the surface. With currently-available systems the foam spacer needs to be at least 10-15 mm thick in order to physically distance the RF tag from the surface by a sufficient amount. Clearly, a spacer of this thickness is impractical for many applications and is prone to being accidentally knocked and damaged.

Other methods have involved providing unique patterned antennas which have been designed to impedance match a particular RF tag with a particular environment.

Visual identifiers such as barcodes are currently employed by the retail and logistics industry to track and trace goods, ranging in size from containers and pallets to individual items. A disadvantage of barcodes is that they require line of sight in order to be interrogated. RFID tags have largely overcome this problem in that they can function without direct line of sight provided that there is RF contact. However, one of the problems with RFID is that after the item has been removed from the controlled area such as a store or depot, the RFID tag is still operable, typically at distances in the region of 3 to 10 meters depending on the interrogating equipment and RF tag being employed. This may be desirable for items which are to be shipped from one location to another. However, there is increased concern over the privacy issue for the consumer that their products are still traceable even after they have bought the item. Hence a person could effectively be scanned unwittingly and their purchases etc could be determined. Further privacy concerns are that the RFID tags could be used to trace the whereabouts of a person. Similarly, in a stock control application, it may be desired to exclude damaged or spoiled stock, even though such stock is still fitted with an RFID device.

RFID chip manufacturers have recently attempted to overcome this problem by using a disable function, such that once the RF tag is read the interrogating device provides a kill command to deactivate the tag. This method provides several drawbacks: firstly if the tag is permanently inoperable then refunds at a shop or reactivation to find out product information will be unduly complicated. If the kill command can be reversed by a secure wake-up command, then this security could be easily bypassed or the codes overcome. Furthermore changes within the chip may be undetectable to the user.

SUMMARY OF THE INVENTION

It is an object of the invention to overcome or ameliorate at least some of the disadvantages associated with the art.

According to a first aspect of the invention there is provided apparatus comprising a resonant dielectric cavity defined between first and second conducting layers, said component having a first state in which an electromagnetic field of a first frequency is enhanced adjacent to said first layer, and a second state in which an electromagnetic field of said first frequency is substantially unaffected, said component being switchable between said first state and said second state by an external stimulus.

Such apparatus provides a mounting or enabling component for an EM tag or device which is responsive to the enhanced field at a mounting site adjacent to the first conducting layer, at an open edge of the cavity. Different states of the device may have different frequency responses and read ranges according to the characteristics of the enhancement.

The resonant dielectric cavity defined between the first and second conducting layers advantageously decouples or isolates the electronic device from surfaces or materials which would otherwise degrade the tag performance, such as metallic surfaces. This property is well documented in applicant's co-pending applications PCT/GB2006/002327 and GB0611983.8, to which reference is hereby directed. These applications describe decoupling of a wide range of RF tags, particularly those that rely upon propagating wave interactions (as opposed to the inductive coupling exhibited by magnetic tags), Hence our preferred embodiment involves application to long-range system tags (e.g. UHF-range and microwave-range tags, also referred to as far-field devices)

The first state will typically be an optimised state of operation providing high read ranges for a tag mounted on the component, and the second state will typically be a deteriorated state, usually a predefined state, in which the enhancement or decoupling properties of the component are degraded to an extent which renders a mounted tag unreadable. The readability of a tag is obviously dependent on reader conditions eg interrogation power and range, and where the readability is changed, by an external stimulus, constant reader conditions are typically assumed.

By changing from first to second states, a tag mounted on the component can—on demand—be made to cease functioning, or at least cease to be properly readable in a quantifiable manner, at the first frequency thus preventing subsequent misuse of the tag.

In other embodiments, the second state would result in a different, typically diminished read range. For example a very short 'near contact' read range might result, typically less than 5 cm, so that a tag can be read but only by a reader in close proximity to the tag. In this way, 'covert' reading of the tag from distance becomes impossible, but the tag can nevertheless still be read if necessary, but with a visibility similar to that of barcode technologies.

This is particularly advantageous when the tag is a low Q tag (an EM tag having a small, untuned antenna, as described below), and/or the component and tag are mounted on a metallic surface, or a material with a high liquid content. In such cases, without the decoupling effect of the mounting component, the read range of the tag is typically reduced to substantially zero.

Accordingly, a second aspect of the invention provides a switchable identification device comprising a resonant dielectric cavity defined between first and second conducting layers and an EM tag located at an edge of said cavity in a field enhancement region, said device having a first state in which the field enhancement is sufficient for the EM tag to be readable, and a second state in which the field enhancement is insufficient for the EM tag to be readable, at a given frequency and read range, said device being switchable between said first and second states by an external stimulus.

In one embodiment, an electromagnetic field of a second frequency is enhanced at said mounting site in said second state. In this way, once the state of the component is changed, although a mounted tag cannot be properly read at the first frequency, it can be read at a second, different frequency. Preferably the second frequency is not enhanced in the first state, and thus the component allows a tag (which need not have any special functionality) to be 'switched' between two frequencies.

The second frequency could be well outside of the standard RFID read frequencies, and could be known only to the proprietor of the device or tag in question. The second frequency could be varied between batches, or even individual products to provide greater control and identification.

In a first set of embodiments, the stimulus is mechanical. As described in the applicant's earlier referenced copending applications, the characteristic length or range of lengths of the tuned conducting layer typically determines the frequency of field which is enhanced, and so changing between two layer lengths can change the frequency of operation of a mounted tag. For example then, the stimulus could be the removal of at least part of said first or second conducting layer, which can for example result in a decrease of the characteristic length or lengths of the first layer.

Preferably, either said first or said second conducting layer comprises a weakened or perforated portion to facilitate the removal. In a preferred embodiment, a set of perforations extend through upper and lower conducting layers, and through the dielectric cavity such that an entire portion of the trilayer structure can be removed. In this way the removal is easy and controlled and leaves a residual portion of predetermined size and shape.

A release layer may be included between said dielectric and either of said first or second conducting portions. This allows removal of the first layer, with or without the dielectric, depending on the positioning of the release layer. Such an arrangement can be used in conjunction with a line of weakness or perforation to allow only a predetermined portion of the first layer to be removed.

In an alternative embodiment, the first layer is adapted to be removable by scratching. This, type of arrangement is familiar from scratch cards and the like, and can be achieved with the use of an aluminium based coating, or elastomeric latex based ink with a high metal loading for example. The removable portion should be microwave-opaque at the frequencies of interest, preferably using a continuous foil (e.g. >2 microns of copper) with a release layer acting as part of the decoupler's core, or a highly electrically percolative metal/dielectric composite.

Removal of a layer may be as a result of physical separation of two adjacent surfaces on which said conducting layers are formed, resulting in the conducting layers being moved out of co-alignment with one another. This may be achieved, for example, by folding two elements into alignment to create a decoupler to allow the tag to be interrogated and subsequently unfolding so as to move the conductor layers out of co-alignment with each other to deactivate or reduce the read range of the tag.

A further set of embodiments are responsive to chemical stimuli. For example a change in length or removal of a conductor layer may be caused by chemically reacting the conducting layer to form a non conducting compound such as its salt, oxide, etc. The conductor layer may be prepared from a metallic material which is sensitive to an externally applied stimuli such as a chemical (acid, alkali etc) or alternatively the conductor material may be enveloped by an air tight seal such that removal of said seal causes a reaction with either a trapped air sensitive compound or by direct oxidation of the metal.

In one embodiment the stimulus may result in increased length of the first or second conductor layer. As an example this increase in length may be afforded by application of a conducting paste, a conducting foil or by creating an electrical connection by any means between the tuned layer and a further metallic portion located proximate to said decoupler. This further metallic portion may be the metal body to which the decoupler is attached.

Removal or addition of conducting material is employed in certain embodiments to change the configuration of the dielectric cavity. As will be described below, cavities can be designed to resonate at wavelengths having twice or four times the characteristic length of the cavity. In an embodiment which is resonant at wavelengths having four times the characteristic length of the cavity, for example, removal of the 'base' portion can leave a device which is resonant at wavelengths having twice the characteristic length of the cavity, thus ensuring a shift to much lower frequencies, without substantially affecting the characteristic length of the device.

In another embodiment, the dielectric core is compressible upon application of a force. Preferably the compression is permanent (non elastic) and occurs between predetermined expanded and compressed states. This results in reduced separation between the conductor layers, which can provide a degradation of performance at a particular frequency.

Further embodiments employ a dielectric which is adapted to change properties on application of the stimulus, in order to change from first to second states. Properties of the dielectric which may be varied include the conductivity, permittivity and loss constant.

In one example the dielectric is adapted to change between a substantially non conducting state and a conducting state on application of said stimulus. All of the dielectric layer may be adapted to change state, or alternatively only a localised portion or portions may be so adapted. The dielectric may comprise or include a UV sensitive polymer which cross links on exposure to UV light. Alternatively the dielectric may comprise or include a material whose conductance can be changed by application of an RF field of a predetermined frequency. Such a material is described in applicant's co-pending WO 06/048663, to which reference is directed.

Another example includes a dielectric region capable of supporting or containing a fluid, for example a porous foam. In this way different proportions of fluid or even different fluids contained within the dielectric region will give rise to changing properties and hence alter the state of the device.

A further example is a dielectric whose electrical conductivity is sensitive to moisture or liquids. For example, a conductive ink may be employed having a soluble binder, so that in dry conditions conductance is high, but when exposed to moisture or another appropriate solvent, the conductivity is severely reduced or lost. By arranging for the binder to have a low melting point, elevated temperatures can cause loss of conductance in the ink.

Another option is a photoconductive substance, able to change conductivity in response to incident light levels.

The above examples of materials which can change between conducting and non-conducting states can be used in embodiments having at least one conducting layer formed of two or more discrete conducting portions linked by bridging portions which switch between a conducting and a non-conducting state on application of the stimulus. Preferably the portions are arranged such that switching of the bridging portions alters the effective length of the conducting layer.

Alternatively, the dielectric can be adapted to change dielectric constant on application of said stimulus. The dielectric constant has a direct effect on the frequency of electric field which is enhanced, and therefore changing the dielectric constant can change the state of the component. This could be achieved with a dielectric including a liquid crystal (LC) compound whose refractive index changes upon application of a stimulus such as an electric or magnetic field or heat.

A further variation is that the loss constant of the dielectric can be adapted to change in response to the stimulus. If the dielectric were made highly lossy, the performance of the device would be significantly reduced.

Various combinations of properties can and frequently will be changed, and the overall resulting change to read range and frequency can be tailored to suit the intended application.

In certain embodiments the component is switchable from the first state to the second state by the stimulus, effectively switching the tag 'off'. In other embodiments however, the component is switched from the second to the first state, effectively activating a previously unreadable tag. Finally, certain embodiments can be returned to the first state or second state respectively by removal of the stimulus, or by a further external stimulus. Such reversibility may also be afforded by reinstatement of part of a previously removed portion of the decoupler, or removal of a short placed across the two conductor layers.

In one embodiment, the stimulus comprises electrically connecting the antenna of the tag to one of the first or second conducting layers.

A further aspect of the invention provides a method of deactivating an identification device, comprising an EM tag mounted on a resonant dielectric cavity defined between first and second conducting layers adapted to enhance an electric field of a first frequency at the site of said EM tag, said method comprising creating an electrical connection between said first and second conducting layers, so as to cause reduced enhancement of said electric field at said first frequency.

In order for the dielectric cavity effectively to provide field enhancement, the first and second conducting layers must be substantially isolated in areas of high electric field strength. By forming an electrical connection between these layers, the field enhancement can be reduced or prevented, thus rendering the tag unreadable at the first frequency.

Creating electrical connection can be performed mechanically in certain embodiments, and may comprise crimping said first and second layers together, or inserting one or more conducting pins, for example a staple or rivet, through said first and second conducting layers. Such crimping or insertion can be performed at a predetermined location, which may be marked on the device. In this way, the deactivation is controlled, and may result in activation at a second, different frequency.

The dielectric layer of the device may be made of a suitable material (either locally or in its entirety), such as a honeycomb, which is crushed or disintegrated by an applied force.

Alternatively, a conducting fluid may be introduced between said first and second conducting layers. The dielectric cavity may include at least a portion capable of receiving or absorbing fluid, for example the dielectric may comprise a corrugated or porous structure, for example cardboard.

In other embodiments, creating an electrical connection comprises changing at least a portion of said dielectric cavity from a substantially non conducting state to a conducting state.

A related aspect provides a method of activation of an identification device, comprising an EM tag mounted on a resonant dielectric cavity defined between first and second conducting layers adapted to enhance an electric field of a first frequency at the site of said EM tag, wherein an electrical connection exists between said first and second conducting layers causing reduced enhancement, said method comprising breaking said electrical connection, so as to restore enhancement of said electric field at said first frequency.

In a further aspect of the invention there is provided a container including an RFID device, said container having an opening mechanism wherein the RFID device is responsive to said opening mechanism to switch between a first state in which the device is readable and a second state in which the device is not readable, at a first frequency and read range.

In this way, the container can be tracked only in the unopened state, identification being prevented automatically on opening of the container. Alternatively the container is optionally tracked in the first state (at a first frequency for example), but identification in the second state (at a second frequency for example) is tracked automatically to indicate the presence of an opened container.

In its most common embodiment the container includes a resonant dielectric cavity defined between first and second conducting layers, and adapted to enhance an electric field at an edge of said cavity, wherein switching between said first and second states varies the degree of enhancement at a given frequency.

Preferably the container includes a separable portion which is separated on opening said container, said dielectric cavity partially extending over said removable portion, wherein separation of said separable portion changes the structure of said dielectric cavity to cause a change in the degree of enhancement.

The container may be structural such a bottle or carton, or the container may comprise a lid or wrapper or other external packaging, and may only serve to indicate opening of the container. This embodiment is particularly useful in anti-tamper or tamper detection applications.

Preferably the separable portion is defined at least partially by a line of structural weakness. This may be an area of reduced material thickness or a series of perforations for example. Preferably the dielectric cavity extends across the line of structural weakness, preferably so that separation of the separable portion changes the structure of the dielectric cavity such that an electric field of a second frequency is enhanced.

Such embodiments are particularly useful where the container is metallic or contains a fluid. In such applications the identification element of the container can be almost undetectable having a thickness less than 1 mm, or 500 µm for example.

A further aspect of the invention provides an environmental sensor comprising a resonant dielectric cavity defined by upper and lower conducting layers, and an EM tag located in an area of electric field enhancement at an edge of said cavity, wherein the electromagnetic properties of said dielectric vary in response to a change in environmental conditions, thereby changing the degree of enhancement between a first state in which the EM tag is readable, and a second state in which the tag is unreadable, at a given frequency and read range.

Embodiments of the sensor are responsive to temperature, atmospheric pressure or moisture content, and comprise a porous dielectric cavity With reference to the dielectric cavity in certain embodiments the first layer does not overlie the second layer in at least one area of absence. This results in a structure which can be thought of as a sub-wavelength resonant cavity for standing waves being open at both ends of the cavity. Where the cavity length, as defined by the area of overlap of the conducting layers, is substantially half the wavelength of incident radiation, a standing wave situation is produced, ie the mounting acts as a ½ wave decoupler as defined in the aforementioned PCT/GB2006/002327.

In such an embodiment, conveniently the length of the second conductor layer is at least the same length as the first conductor layer. More preferably the second conductor layer is longer than the first conductor layer.

This structure results in the strength of the electromagnetic fields in the core being resonantly enhanced, resulting in field strengths of 50 or 100 times greater than that of the incident radiation. Advantageously, enhancement factors of 200 or even 300 or more can be produced. In more specific applications typically involving very small devices, lower enhancement factors of 20, 30 or 40 times may still result in a readable system which would not be possible without such enhancement. The field pattern is such that the electric field is strongest (has an anti-node) at the open ends of the cavity. Due to the cavity having a small thickness the field strength falls off very quickly with increasing distance away from the open end outside the cavity. This results in a region of near-zero electric field a short distance—typically 5 mm—beyond the open ends, in juxtaposition to the highly enhanced field region. An electronic device or EM tag placed in this area therefore will be exposed to a high field gradient and high electrical potential gradient, irrespective of the surface on which the tag and decoupler are mounted.

An EM tag placed in the region of high potential gradient will undergo differential capacitive coupling: the part of the tag exposed to a high potential from the cavity will itself be charged to a high potential as is the nature of capacitive coupling. The part of the tag exposed to a low potential will similarly be charged to a low potential. If the sections of the EM tag to either side of the chip are in regions of different electrical potential this creates a potential difference across the chip which in embodiments of the present invention is sufficient to drive it into operation. The magnitude of the potential difference will depend on the dimensions and materials of the decoupler and on the position and orientation of the EM tag.

Typical EPC Gen 2 RFID chips have a threshold voltage of 0.5V, below which they cannot be read. If the entirety of the voltage across the open end of the cavity were to appear across the chip then based on a 1 mm thick core and simple integration of the electric field across the open end, the electric field would need to have a magnitude of approximately 250V/m. If a typical incident wave amplitude at the device is 2.5V/m—consistent with a standard RFID reader system operating at a distance of approximately 5 m then an enhancement factor of approximately 100 would be required. Embodiments in which the field enhancement is greater will afford greater read-range before the enhancement of the incident amplitude becomes insufficient to power the chip.

The present invention therefore provides a device that can be used on any surface and will decouple an EM tag placed thereon from any surface effects. When used in accordance with aspects of the invention an RFID tag can be read at the same range as it could in air or in some cases at a greater range. This obviates the need for antenna redesign or a high index spacer material whilst maintaining a very small overall thickness.

Preferably an electronic device or tag is mounted or can be mounted on a mounting site substantially over the area of absence. The electromagnetic field may also be enhanced at certain edges of the dielectric core layer, therefore conveniently the mounting site may also be located on at least one of the edges of the dielectric core layer which exhibits increased electric field. The device or tag is preferably not in direct electrical contact with the upper or lower conducting layers, and is preferably located within 5 mm, 10 mm or 20 mm from an open edge of the cavity.

RF tags may be designed to operate at any frequencies, such as for example in the range of from 100 MHz up to 600 GHz. In a preferred embodiment the RF tag is a UHF (Ultra-High Frequency) tag, such as, for example, tags which have a chip and antenna and operate at 866 MHz, 915 MHz or 954 MHz, or a microwave-range tag that operates at 2.4-2.5 GHz or 5.8 GHz.

The area(s) of absence may be small, discrete crosses, or L-shapes but more conveniently are slits wherein the width of the slit is less than the intended wavelength of operation. A slit may be any rectilinear or curvilinear channel, groove, or void in the conductor layer material. The slit may optionally be filled with a non conducting material or further dielectric core layer material.

The invention can therefore provide a multi-layer structure that acts as a radiation decoupling device. First and second conductor layers sandwich a dielectric core. Where the first conductor layer contains at least two islands i.e. conducting regions separated by an area of absence or a slit, preferably the one or more areas of absence is a sub-wavelength area of absence (i.e. less than $\lambda$ in at least one dimension) or more preferably a sub wavelength width slit, which exposes the dielectric core to the atmosphere. Conveniently, where the area of absence occurs at the perimeter of the decoupler to form a single island or where at least one edge of the dielectric core forms the area of absence then said area of absence does not need to be sub wavelength in its width.

The sum thickness of the dielectric core and first conductor layer of the decoupler structure may be less than a quarter-wavelength in its total thickness, and is therefore thinner and lighter compared to prior art systems. Selection of the dielectric layer can allow the decoupler to be flexible, enabling it to be applied to non-planar or curved surfaces. Conveniently, the decoupler may not be planer and may take the form of a non-planar or curved geometry.

The length G of the first conductor layer may be determined by $\lambda \approx 2nG$, where n is the refractive index of the dielectric, and $\lambda$ is the intended wavelength of operation of the decoupler. Clearly this is for the first harmonic (i.e. fundamental) frequency, but other resonant frequencies may be employed.

Conveniently it may be desirable to provide a decoupler with length G spacings that correspond to harmonic frequencies other than the fundamental resonant frequency. Therefore the length G may be represented by $\lambda \approx (2nG)/N$ where N is an integer (N=1 indicating the fundamental). In most instances it will be desirable to use the fundamental frequency as it will typically provide the strongest response, however harmonic operation may offer advantages in terms of smaller footprint, lower profile and enhanced battery life even though it's not idealised in performance terms.

Considering the dielectric cavity of other embodiments, the first layer and the second layer are electrically connected at one edge, forming a substantially "C" shaped section. This results in a structure which can be thought of as a sub-wavelength resonant cavity for standing waves being closed at one end of the cavity. Where the cavity length is substantially a quarter the wavelength of incident radiation, a standing wave situation is produced: the conducting base portion and two wall portions together create a continuous metal boundary around three sides of the dielectric core and force the electric field parallel to the surface of the base portion to be a minimum (or a node) at the base portion and therefore (since it is a quarter-wavelength long) at the opposite end of the cavity structure to the conducting base portion the electric field is at a maximum (antinode). In this way the mounting acts as a ¼ wave decoupler as defined in the aforementioned GB0611983.8

In such an embodiment, the two conductor layers can be considered to form a cavity structure which comprises a conducting base portion connected to a first conducting side wall, to form a tuned conductor layer, and a second conducting side wall, the first conducting side wall and second conducting side wall being spaced apart and substantially parallel.

The conducting base portion forces the electric field to be a minimum (or a node) at the base portion and therefore at the opposite end of the cavity structure to the conducting base portion the electric field is at a maximum (antinode). An electronic device or EM tag placed in this area therefore will be located in an area of strong field, irrespective of the surface on which the tag and decoupler are mounted.

Conveniently, the first conducting side wall has a continuous length of approximately $\lambda_d/4$ measured from the conducting base portion, where $\lambda_d$ is the wavelength, in the dielectric material, of EM radiation at the frequency of operation v.

Both the ½ and ¼ wave embodiments described above comprise a tuning conductor layer and a further conductor layer; preferably this further conductor layer is at least the same length as the tuning conductor layer, more preferably longer than the tuning conductor layer.

The two conductor layers are separated by a dielectric layer. They may be electrically connected at one end to create a closed cavity ¼ wave decoupler as hereinbefore defined, or contain conducting vias between the two conductor layers in regions of low electric field strength. However, there should be substantially no electrical connections between the two conductor layers in regions of high electric field strength or at the perimeter of the decoupler for open ended ½ wave embodiment, or at more than one end or perimeter for ¼ wave (closed end) embodiment.

It may be desirable that for a metallic body which is to be tracked by RFID, that at least one of the conductor layers is part of said metallic body. Preferably, it will not be the tuned conductor layer.

RF tags generally consist of a chip electrically connected to an integral antenna of a length that is generally comparable with (e.g. $\frac{1}{3}^{rd}$ of) their operational wavelength. The present inventors have previously found that tags having much smaller and untuned antennas (i.e. which would not normally be expected to operate efficiently at UHF wavelengths) can be used in conjunction with a decoupler as defined in co-pending application herein defined. Usually tags with such 'stunted' antennas (sometimes referred to as low-Q antennas, as will be appreciated by one skilled in the art) possess only a few centimeters or even millimeters read range in open space. However, it has surprisingly been found that using such a tag with a low-Q antenna mounted on a decoupler of the present invention may be operable and exhibit useful read ranges approaching (or even exceeding) that of an optimised commercially-available EM tag operating in free space without a decoupler. Low-Q antennas may be cheaper to manufacture, and may occupy less surface area (i.e. the antenna length of such a tag may be shorter than is usually possible) than a conventional tuned antenna. Therefore the EM tag may be a low Q-tag, i.e. an EM tag having a small, untuned antenna. Conveniently the device will incorporate a low Q antenna, such that upon deactivation of the decoupler the read range of the low Q tag is caused to be that of a few centimeters or even millimeters.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

DESCRIPTION OF THE DRAWINGS

Preferred features of the present invention will now be described, purely by way of example, with reference to the accompanying drawings, in which.

DESCRIPTION OF THE INVENTION

Figure 1:
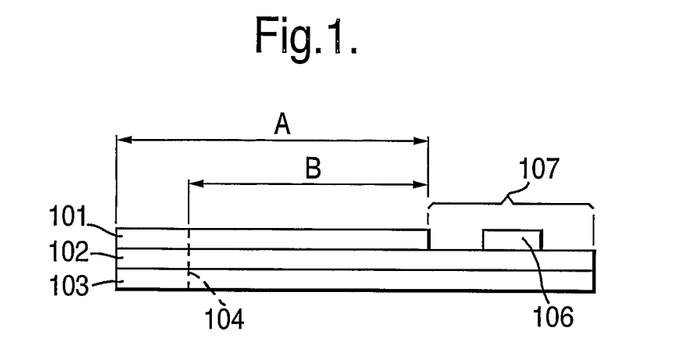
FIG. 1 shows a cross section of a device containing a perforated portion.

FIG. 1 shows a tag with a low Q antenna (small area antenna) 106 mounted on a single island decoupler containing a first conductor layer 101 (tuned conductor layer) with an area of absence 107 located at the end of the first conductor layer 101. The first conductor layer 101 and second conductor layer 103 sandwich the dielectric layer 102. The length A of the first conductor layer will determine the frequency of the decoupler (for a specific dielectric layer—material and thickness and also to a lesser extent conductivity of the conductor layers) and is selected to match the frequency of a particular reader device.

The decoupler contains a structural weakness or perforation 104 extending through all three layers which will allow the decoupler to be reduced in length such that the tuned length of the decoupler is reduced to length B, causing a mismatch between the decoupler and the reader, of sufficient magnitude that the decoupler no longer allows the low Q tag to be successfully interrogated with that particular reader.

Figure 2:
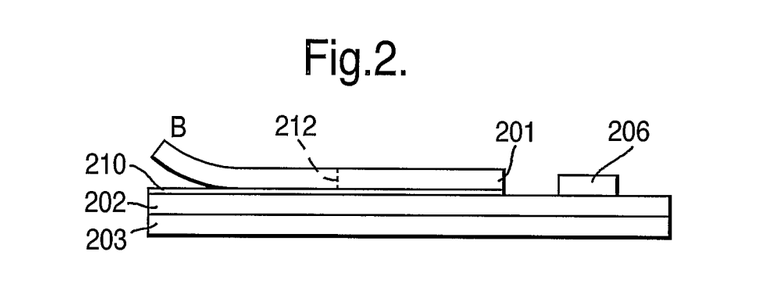
FIG. 2 shows a cross section of a device with layers which can be peeled-off.

FIG. 2 shows an arrangement similar to that of FIG. 1, providing a tag with a low Q antenna (small area antenna) 206 mounted on a decoupler containing a first conductor layer 201 (tuned conductor layer) and an area of absence at the end of the first conductor layer. The first conductor layer 201 and second conductor layer 203 sandwich the dielectric layer 202.

A release layer 210 is provided between conductor layer 201 and the dielectric layer. This allows the conductor layer to be peeled away from the dielectric as shown at B. A perforation 212 may additionally be included through layer 201 and optionally release layer 210 such that a controlled length of layer 201 remains intact after removal.

Figure 3:
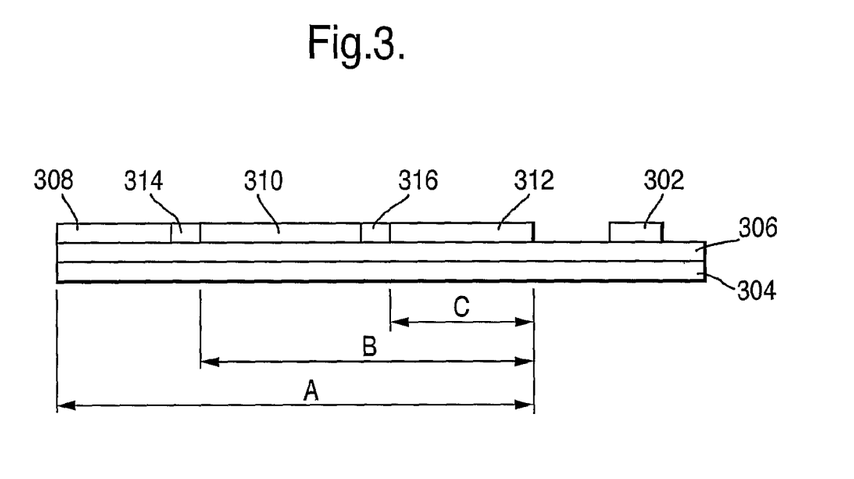
FIGS. 3 and 4 show embodiments of the invention in which the effective length of the device can be selected from discrete values.

Turning to FIG. 3, there is shown a tag 302 mounted on a half wave decoupler comprising a base conducting layer 304 and a dielectric layer 306. On top of the dielectric layer, an upper or tuned conducting layer is formed of three conducting portions 308, 310, 312, joined by bridging portions 314 and 316. Portions 308, 310, 312 are normal metal portions, for example copper or aluminium, while bridging portions 314 and 316 are such that they can change between conducting and non-conducting states. A number of possibilities for such portions are provided above but, for example, they may be a conductive ink having a low melting point binder, such that they become electrically insulating at elevated temperatures. The length of the upper plane of the decoupler of FIG. 3 can therefore be changed by affecting the conductance of the bridging portions. With both portions 314 and 316 conducting, the length will be A. If bridging portion 314 is made non conducting, then the effective length is reduced to B, and if both bridging portions are made non-conducting then the length is further reduced to C. This may be useful where A and B correspond to different useable frequencies of operation, and where C is sufficiently short that the decoupler is effectively deactivated.

Figure 4:
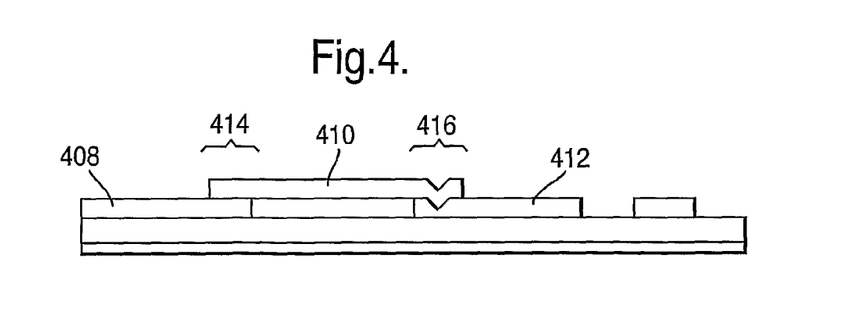

FIG. 4 illustrates an alternative arrangement by which the effective length of the upper plane can be controlled in a number of discrete steps. Rather than bridging portions, here the upper conducting layer is made up of three overlapping metal portions 408, 410 and 412. Where two layers overlap at regions 414 and 416, they are separated by a very thin dielectric layer (not shown) which may for example be a thin oxide film on the surface of the metal. Initially therefore, only portion 412 acts as the conducting layer, however by embossing one of the overlapping regions, as shown at 416, the insulating barrier is overcome, and electrical connection is made between the two conducting portions, extending the effective length of the tuned plane. Thus the length of the plane can be altered by selectively embossing the overlapping portions.

Figure 5:
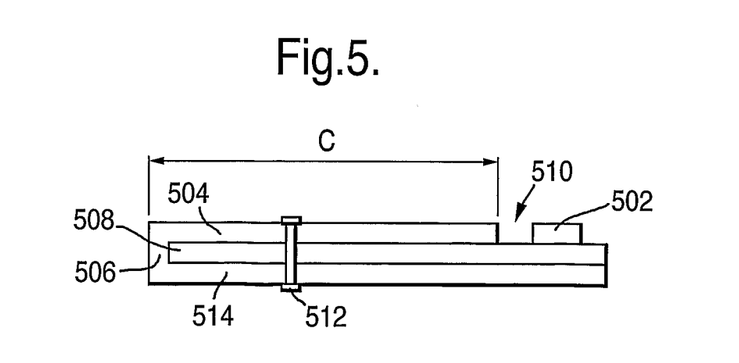
FIG. 5 illustrates a cross section of a device, with additional deactivating conducting vias.

FIG. 5 shows a cross section of a low Q tag 502 mounted on a ¼ wave decoupler, where the first conductor layer 504 has a length C of a ¼ wavelength of the radiation of the intended wavelength of operation (with due consideration to the refractive index of the core material). The ¼ wave decoupler as previously described contains a conducting end portion 506 which provides the closed cavity and creates the desired standing wave within the dielectric core 508. A standing wave is established in use, with a node (not shown) substantially located at the closed end, and the antinode at the open end region 510, where the tag 502 is located. The node is a region of low electric field, if one or more further metallic conducting vias 512 are located between the end portion 506 and the open end 510, this will affect the standing wave that is set up in the dielectric cavity 508. Here the via 512 comprises a metal rivet or pin that is punched through all three layers so as to electrically connect the first conductor layer 504 and the second conductor layer 514. It may be convenient to think of the via 512 as creating a new base portion such that the standing wave is disrupted within the cavity 508. In certain applications it may be preferable to locate the via proximate to the open end 510 to ensure increased disruption of the standing wave.

The via or vias preferably extend substantially across the entire width (as viewed into the page) of the decoupler, however the width will typically be dictated by the necessary degradation in read range for a particular application. For example, forming an electrical connection across ⅔ of the width may be sufficient.

If a half wave device was used, rather than the quarter wave device of FIG. 5, the insertion of sufficiently wide conducting vias is analogous to the addition of a conducting base portion, effectively resulting in a quarter wave device, having a markedly different tuned frequency.

Figure 6:
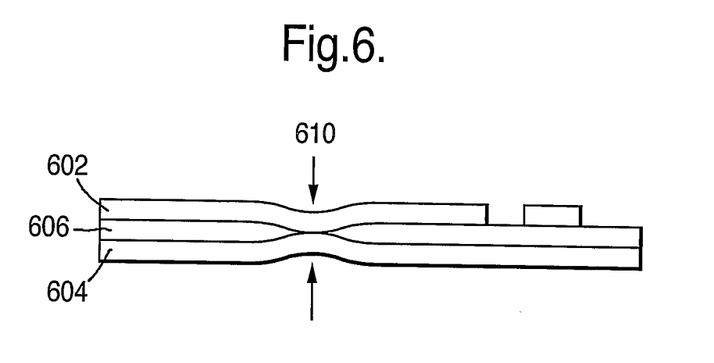
FIG. 6 shows a cross section of a device with the two conducting layers forced into contact.

FIG. 6 shows a cross section of a ½ wave decoupler, where the first conducting layer 602 and the second conducting layer 604 have been caused to contact one another at a point 610. Part or all of the dielectric layer 606 (or indeed a support structure if the dielectric core is an air gap) has been displaced from this area to allow contact. In addition to or instead of simple physical displacement, the dielectric layer may be partially or completely removed by some means, such as for example mechanical removal or chemical degradation. In some embodiments, the portion of the dielectric at or local to the point of contact is weakened or made susceptible to removal. Electrical connection between the first and second layers in this way disrupts the standing wave that would otherwise be set up in the dielectric cavity.

It will be appreciated, in view of the above description that in certain implementations the right hand portion of FIG. 6 can continue to operate as a quarter wave device, with the crimped portion forming a closed end. Further embodiments, such as that illustrated in FIG. 7 exploit the change in form of the cavity structure from half to quarter wave variants, or vice versa.

Figure 7:
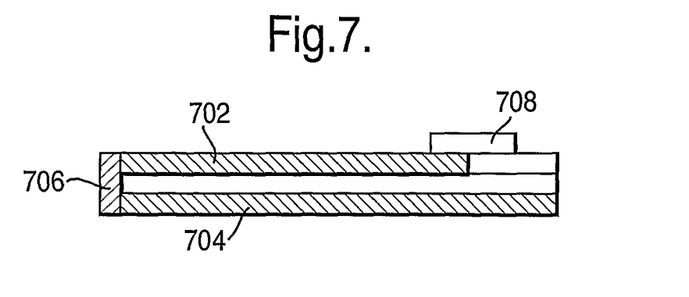
FIG. 7 shows a device having a base portion which is formed of conductive ink.

The quarter wave device of FIG. 7 comprises upper and lower conducting planes 702 and 704 respectively formed of aluminium or copper. The conducting end portion 706, which forms the closed end of the cavity and constrains the electric field to be zero at that end, is formed by printing a conducting ink having a soluble binder. As has been explained, the enhancement of incident radiation of such a device is centred around a wavelength approximately 4 times dimension R, such that incident radiation of this wavelength drives chip and loop structure 708 into operation producing a readable characteristic.

If the device is exposed to moisture, the conductivity of end portion 706 is severely reduced such that the cavity is now effectively open at both ends, and the device operates on the half wave principle. As such, incident radiation at a frequency which previously provided a readable characteristic is not sufficiently enhanced at the chip and loop. Since the chip and loop itself is untuned, it is not capable of being read at any significant distance, and the device ceases to return a result on interrogation (at a given frequency and read range). Depending on the exact composition of the conductive ink and the degree of moisture the device may still be readable at a reduced read range, however the relevant parameters can be selected to ensure that the device ceases to respond to a reader at a fixed distance, after a predetermined level of moisture is reached. In this way, the device acts as an environmental sensor, capable of detecting levels of moisture, for example in a stockroom or warehouse, with periodic or continuous reading of a number of tagged items providing information on the proportion or even the identity of those items which have been exposed to a certain level of moisture.

Since the device of FIG. 7, having been exposed to moisture, now operates as a half wave device, radiation of a new wavelength at half of the previous operating wavelength will cause enhancement, and hence drive the chip into operation. In other words, positive identification of devices having been exposed to moisture can be made, by interrogating at the new frequency to achieve a successful read from devices which have switched to operate in a half wave mode.

Figure 8A:
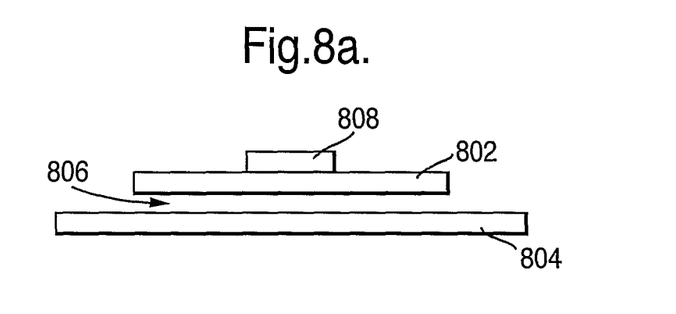
FIGS. 8*a* to 8*c* illustrate changing configurations of a device following removal of selected portions.
Figure 8B:
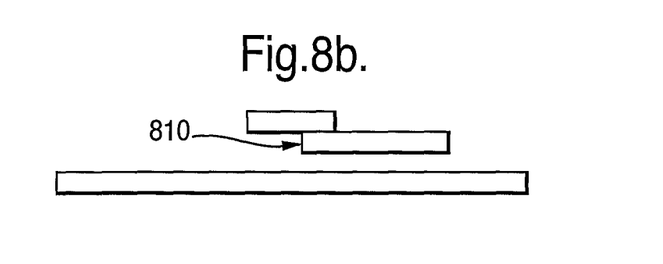
Figure 8C:
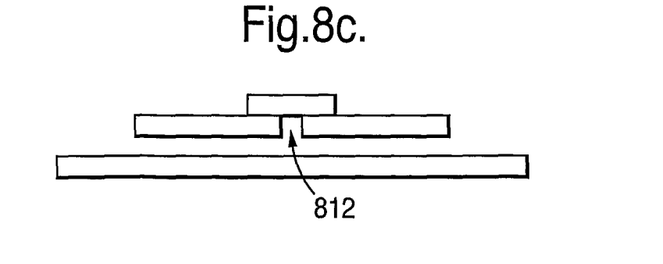

FIG. 8a shows a device comprising upper and lower conducting layers 802, 804 separated by a dielectric cavity 806. Here a chip and loop arrangement 808 is located not at the edge of the upper layer, but substantially at its centre, away from areas where electric field enhancement can occur. As such the read range of such a device is very low, and the device may be considered inoperative for most tagging applications. FIGS. 8b and 8c show that the device can be 'activated' for certain frequencies by the removal or a portion of upper conducting layer 802. In FIG. 8b half of the upper layer is removed, resulting in the edge 810 of the upper layer now running adjacent to the chip and loop, which is then exposed to an area of electric field enhancement and can experience a sufficiently great electric potential to provide a response to a reader at the appropriate frequency. Alternatively in FIG. 8c, a central strip or slit 812 of the upper layer is removed, and again the chip and loop 808 is subject to electric field enhancement by virtue its location at the edge of the resonant cavity. In both cases, removal of a portion of the conducting layer, or equally the change of state of a portion of the layer from conducting to non-conducting, 'activates' the device. Multiple mechanisms, as described above, may be employed to cause the removal of the conducting portion.

Figure 9:
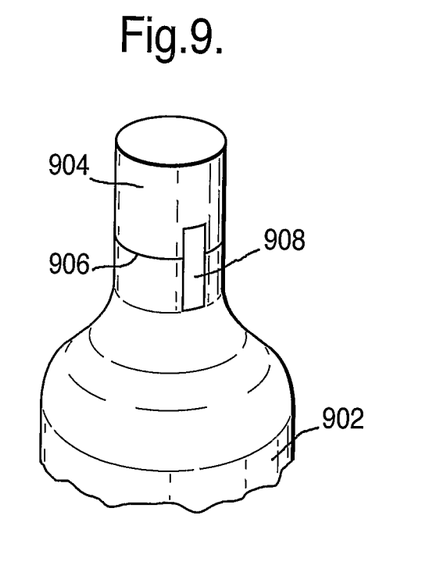
FIG. 9 shows a container having a tag/decoupler arrangement mounted thereon.

FIG. 9 shows the neck of a bottle 902 including a detachable screw cap portion 904. the cap is defined by a line of weakness 906 designed to fracture on removal of the cap. A tag and decoupler 908 are mounted on the bottle, overlying the line of weakness, such that removal of the cap results in breakage of the decoupler. Such breakage causes the tag to become unreadable at a first frequency, and as such the state of the bottle (opened/unopened) can easily be determined by RF interrogation.

The above description illustrates many preferred features and embodiments of the present invention, however it is considered helpful to provide further examples of specific implementations and applications as follows.

The ability to sense the presence of moisture in a given environment is of great value to certain industries, especially where the storage of delicate equipment is concerned (e.g. electronic goods, clothing, foodstuffs, etc). A variety of moisture sensors are commercially available, ranging from relatively bulky devices such as hygrometers (e.g. the two-thermometer system of the psychrometer, which relies upon the evaporation of moisture from the thermometer bulb that is exposed to moist-air environment to reduce its temperature relative to that of a protected 'dry-bulb' in a characteristic way) through to electronic systems such as the chilled mirror hygrometer (a cooled mirror collects condensation that is detected and monitored via optical measurements) and simple moisture-sensitive labels that change colour when they absorb water from the atmosphere. However, few solutions are small, cheap and robust enough to be applied to packaging, and fewer still can supply an automated response that does not rely upon visual inspection.

As described above, devices described herein can be sensitive to the presence of moisture in a given container or environment, and arranged to send a warning signal to the storage controller when a certain level of exposure has been reached. Such a system overcomes the problems described above, and also exhibits the advantage that it can exploit the existing architecture of a standard RFID system within a storeroom.

A suitable device exhibits a dielectric core that is hygroscopic (moisture-absorbing). Several such materials exist, such as deliquescent materials that will eventually dissolve when they have absorbed a sufficient amount of water. Examples of deliquescent materials include calcium chloride, magnesium chloride, zinc chloride and sodium hydroxide (the latter being a strong alkali that could be used to etch away regions of metal when it is exposed to water). A deliquescent core would vary the resonant frequency according to its moisture content, and a device could be designed such that the resonance of the device could reach a standard UHF RFID frequency value when a specific amount of moisture was absorbed, resulting in the tag producing a warning response when interrogated (interrogation being a continual process in a store-room, with no responses indicating sufficiently dry goods).

Alternatively the working 'dry tag' can be arranged to fail to respond to interrogation when it absorbs a sufficient level of moisture.

A third option is for only a portion of the dielectric cavity of the tag to be deliquescent, which portion completely dissolves, leading to the collapse of one section of the metal/dielectric/metal sandwich. The sandwich structure may be pre-stressed to assist collapse. This retunes the device, switching it to an interrogation frequency such that it can send a warning.

It should be noted that the ingress of water not only switches the resonant frequency: in this example it also increases loss in the system, and hence reduces the read-range of the tag from its optimal lossless-core potential. This must be considered when designing the interrogation system, as will be discussed. It should also be noted that some hygroscopic materials will either swell or contract as they absorb water, leading to another control parameter in the design of the device.

An alternative to deliquescent material is the use of a porous material in the core that adsorbs moisture, collecting it on its surfaces rather than it being absorbed into the material itself. As an example, polyHIPE foams (polymeric high internal phase emulsions) are porous dielectrics that can be created with a tailored pore size and controlled degree of interconnection, ranging from closed 'bubbles' through to an open mesh of interconnected polymer strands. This enables the fabrication of a material of both a specified volume fraction of open pores and clear paths through the foam such that water can permeate into all of the voids. Here we will consider as an example a foam of PTFE (polytetrafluoroethylene) was produced by some method such that it was 45% porous by volume. According to available models, the real component of permittivity of such materials at microwave frequencies is likely to be of the order of 1.493 (as opposed to 2.1 for bulk material), with virtually no absorption by the material (i.e. the complex permittivity is (1.493, 0.008)). The material is presumed to be non-dispersive at the frequencies of interest.

If this foam is now filled with water then the same calculations predict that the permittivity becomes (17.059, 0.355) at 866 MHz.

Figure 10:
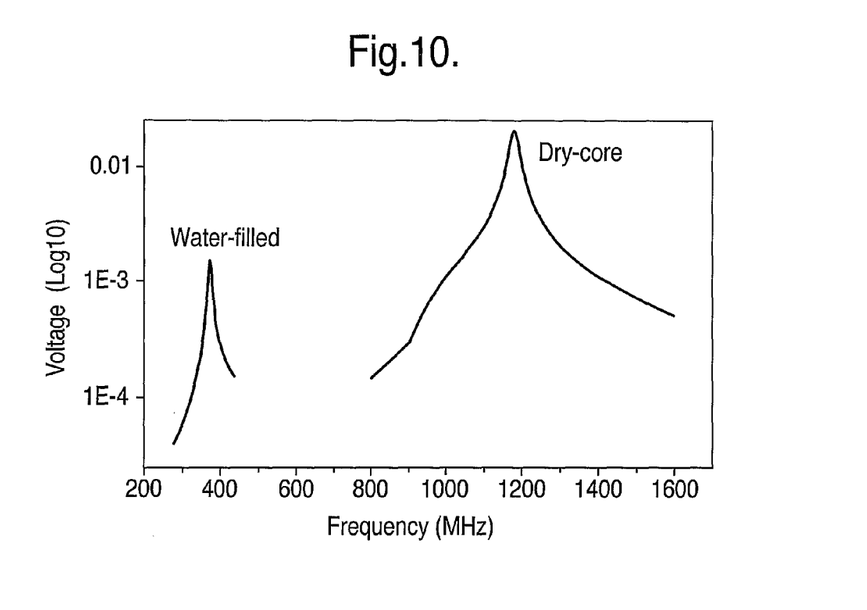
FIGS. 10 and 11 illustrate the response of devices in different states according to the proportion of fluid in the dielectric core.

Finite element modelling of a half-wave device (core thickness 1 mm, 110 mm long metal superstrate, 130 mm long metal substrate, 20 mm device width, commercially available Impinj Monza 1A chip) shows that the replacement of the standard polyester core to a dry, 45%-voided PTFE foam core shifts the peak resonance to from 866 MHz to just below 1.18 GHz. When it has adsorbed sufficient water to fill the air cavities in the foam, this resonance shifts down to 373 MHz, and is less intense due to the lossiness of the core (i.e. the voltage across the silicon chip is reduced, and hence so is the read-range of the device). This predicted response is illustrated in FIG. 10. The adsorption of water could therefore shift the resonant frequency to either side of a standard interrogation frequency, and could hence be designed—via control of porosity and device dimensions—such that it became operable in either its dry or its wet state.

Due to the dispersion of water, the real component remains relatively constant at lower frequencies, but the imaginary component falls to 0.09 at 200 MHz: this effect is in fact not accounted for above, but would result in a stronger signal and a slight shift to higher frequencies.

It should be noted that the water, or other fluid, does not need to permeate the entire device and that a change in permittivity at the edges would be sufficient to retune the device by a predictable shift in frequency. Similarly, the foam region need not encompass the whole core. This may be useful in setting an upper limit to the adsorption of water, to ensure that the device reaches a specified permittivity, and hence resonant frequency.

In a more sophisticated embodiment, conducting portions of the tag, eg the upper and lower conducting layers, are used to heat the tag, and hence drive out the water such that it could be re-used (i.e. return it to its dry state).

Figure 11:
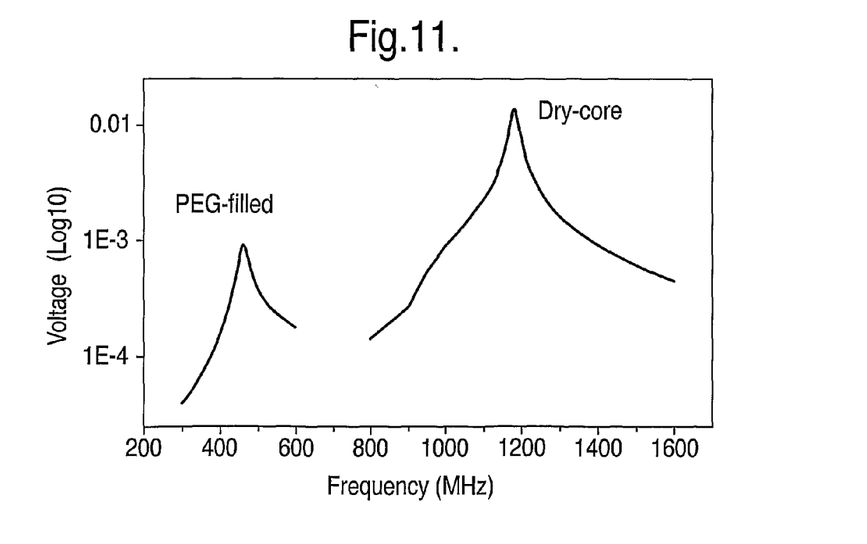

In a variation of the moisture sensitive embodiment described above, other dielectrics can be used in the place of water. For example, ethylene glycol (EG) is a colourless, odourless and hygroscopic liquid of formula $HOCH_2CH_2OH$. Using the same effective medium models for a 45%-voided PTFE foam, the permittivity of the EG-filled foam is predicted to be (11.100, 0.584). This results in a similar resonance shift as in the case of water—see FIG. 11—with the peak voltage experienced by the chip being located at 460 MHz.

At a temperature of 25° C. it exhibits a viscosity $\eta$ of 16.1 mPa·s, making it similar in consistency to honey (10.0 mPa·s at 20° C.), but this drops to 1.98 mPa·s at 100° C., making it flow like water. Due to the hygroscopic nature of EG it is miscible with water, meaning that it can be diluted and hence reduced in viscosity, but in all cases the general trend is that it can be designed such that it is relatively viscous at low temperatures and flows more readily as it is warmed. Note that polymerised forms of ethylene glycol (PEG: $H(OCH2CH2)_nOH$) exhibit viscosities that increase with degree of polymerisation n, enabling further control of its physical properties with only minor perturbations of its permittivity. For the purposes of the following discussion, EG is taken to encompass both pure ethylene glycols of any value of n (generally of a molecular weight below 700 since the materials become waxy solids at higher values) and solutions thereof.

The viscous properties of (P)EG could be exploited in a device which functions as an atmospheric pressure sensor. If the liquid-filled, foam-cored device is exposed to a partial vacuum then the glycol will be leeched from core, shifting the resonance towards higher frequencies and voltages of greater magnitude (i.e. potentially longer read-ranges). This may also be achieved with the device described above employing a water (moisture) filled core, relying upon capillarity to hold the moisture in the core, but the viscous nature of a glycol may be beneficial, especially with thicker-cored samples.

In a further variation, the temperature-dependence of the viscosity may be used to allow the device to operate as a temperature sensor. If the pore-size of the foam is chosen with care, the EG will remain within the core at low (room) temperatures due to its relatively high viscosity, but will flow out of the core once a specific temperature has been exceeded.

A still further variation of the device with a low-viscosity fluid-filled core could be designed to act as an anti-tamper device or impact sensor. If the core is designed such that any interference will break an impermeable barrier around the core (e.g. a friable polymeric dip-coat) then the fluid will leak out, altering the resonant frequency as described above, and ideally switching the device to its active state so as to provide a return signal to a reader to indicate the event.

As noted above, embodiments may be switched between states by varying the electromagnetic properties of the dielectric cavity. It is a well-established fact that some materials will change their electromagnetic properties when in the presence of intense electric fields. Perhaps the best-known of such materials are the liquid crystals (LCs): the refractive index of each LC molecule differs according to its orientation with respect to the incident light, and this alignment can be controlled via the application of an electric field across a layer of the material, enabling the optical properties to be 'switched' between states. This phenomenon is the basis of liquid crystal display technology, and is hence a well-characterised process with regard to optical interactions. The same phenomenon however, is equally applicable at other wavelengths, including the millimetric and centimetric regimes.

For example, it has been shown that thin (75 micron) films of Merck-E7 liquid crystal, interleaved within a stack of 1 mm thick aluminium plates, can be used as the basis of a voltage-controlled microwave frequency filter. An alternating current (1 kHz) voltage of up to 7 Volts was applied between adjacent metal plates, creating an intense electric field across the liquid crystal layers that realigns their molecules, thereby controlling the refractive index that was experienced by microwaves travelling between the plates. It was shown that the effective refractive index of the liquid crystal, as experienced by the microwaves propagating through the device, varied from n=1.649 at zero voltage to n~1.8 when 7.0V is exceeded.

Finite element modelling of a half-wave device RFID device (core thickness 1 mm, 110 mm long metal superstrate, 130 mm long metal substrate, 20 mm device width, Impinj Monza 1A chip) was performed, with a liquid crystal core at refractive indices of firstly n=1.649 and secondly n=1.800. It was found that the device was resonant (i.e. the voltage across the chip was maximised) at frequencies of 895 MHz and 826 MHz, respectively. It will be understood by the skilled person then, that a device could easily be adapted to switch to and across the standard European UHF RFID frequency band (865 MHz to 868 MHz).

The metal/dielectric/metal geometry of the device is exceptionally well-suited to the task of manipulating liquid crystalline materials. Firstly, the thin core will only require a very small volume of liquid crystal (indeed, designs of the core are envisaged such that it is only partially filled with liquid crystal (e.g. only an even thinner central layer within a plastic core, or some other fractional section of the dielectric layer). Secondly, the two metallic layers of a half-wave device present ideal electrodes for voltage-control of the core: a battery with its terminals attached to the two layers could be switched on and off to obtain the required voltage shift (both d.c. and a.c. operation is possible, although a.c. will be favoured for high voltages and long-term usage in order to avoid breakdown on the liquid crystal).

Another possible method by which voltage-control could be introduced into the structure is via the use of a polymer-dispersed liquid crystal (pdlc). A pdlc is essentially a porous polymer sheet in which the pores are filled with a liquid crystal, providing a convenient packaging method. These are typically switched between an opaque (light-scattering) zero-voltage state and transparency when all molecules are aligned by the application of a voltage. A pdlc sheet could conveniently be used as the core of our device, although it should be noted that the smaller volume fraction of liquid crystal will result in a less pronounced shift in refractive index than in the case of a continuous layer (as per the above example).

A voltage controlled device as illustrated above has applications in international functionality, allowing a deliberate shift of UHF frequencies on demand (e.g. high-voltage EU to zero-voltage US when exported. This can be produced for example by breaking a battery connection when the device leaves the country (via fusing inks or mechanical breakage).

Such a break in battery connection could also be exploited to provide tamper-evidence: the tag is designed to be altered if the package to which it is attached is tampered with, changing the voltage that is applied across the core. For example, the battery connection may be broken by any tampering, removing the voltage and activating the tag such that a warning signal can be received by interrogators.

Finally, remote detection of electrical contact can be achieved by placing the device on a metallic item in such a manner that a voltage is induced across it if the item itself becomes charged or part of an electrical circuit. For example, a device could be used to detect when a circuit is 'live', or could become active when power is lost, sending a warning signal when interrogated.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. Apparatus comprising a resonant dielectric cavity defined between first and second conducting layers, said apparatus having a first state in which an electromagnetic field of a first frequency is enhanced adjacent to said first layer, and a second state in which an electromagnetic field of said first frequency is substantially unaffected, said component being switchable between said first state and said second state by an external stimulus.

2. Apparatus according to claim 1, wherein said stimulus is the removal of at least part of said first or second conducting layer.

3. Apparatus according to claim 2, wherein removal results in a change of length of said first layer.

4. Apparatus according to claim 1, wherein either said first or said second conducting layer comprises a weakened or perforated portion to facilitate said removal of material.

5. Apparatus according to claim 1, wherein a release layer is included between said dielectric and either of said first or second conducting portions to facilitate said removal.

6. Apparatus according to claim 1, wherein said first layer is adapted to be removable by scratching.

7. Apparatus according to claim 1, wherein at least a portion of said dielectric is adapted to change between a substantially non conducting state and a conducting state on application of said stimulus.

8. Apparatus according to claim 7, wherein said stimulus comprises applying an RF field of a predetermined frequency.

9. Apparatus according to claim 7, wherein said stimulus comprises exposure to UV radiation.

10. Apparatus according to claim 7, wherein the stimulus comprises an applied electric potential.

11. Apparatus according to claim 7, wherein said dielectric is porous.

12. Apparatus according to claim 1, wherein at least a portion of said dielectric is adapted to change dielectric constant on application of said stimulus.

13. Apparatus according to claim 1, wherein said electromagnetic field is enhanced by a factor greater than or equal to 50, 100, or 200.

14. Apparatus according to claim 1, wherein an electromagnetic field of a second frequency is enhanced at said mounting site in said second state.

15. Apparatus according to claim 1 including an EM tag located at an edge of said cavity in a field enhancement region wherein in the first state the field enhancement is sufficient for the EM tag to be readable, and in the second state the field enhancement is insufficient for the EM tag to be readable at a given frequency and read range.

16. A device according to claim 15, wherein said tag is powered by differential capacitive coupling.

17. A device according to claim 15, wherein the EM tag is a low Q RFID tag.

18. The apparatus of claim 15 wherein the electromagnetic properties of said dielectric vary in response to a change in environmental conditions, thereby changing the degree of enhancement between a first state in which the EM tag is readable, and a second state in which the tag is unreadable, at a given frequency and read range.

19. Apparatus according to claim 15, wherein said EM tag is electrically isolated from said first conductor layer.

20. Apparatus according to claim 1, wherein said apparatus can be returned to said first state by a further external stimulus.

21. Apparatus according to claim 1, wherein the first conducting layer does not overlie the second conducting layer in at least one area of absence.

22. Apparatus according to claim 21, wherein a tag is mounted or adapted to be mounted at said area of absence.

23. Apparatus according to claim 22 wherein the spacing G between at least one edge of the first conductor layer and the area of absence is determined by $G=\lambda/2n$ where n is the refractive index of the dielectric, and A is the intended wavelength of operation of the decoupler.

24. Apparatus according to claim 23 wherein the areas of absence are slit structures.

25. Apparatus according to claim 24 wherein the slit width is less than 500 microns.

26. Apparatus according to claim 1, wherein said first layer and said second layer are electrically connected at one edge.

27. Apparatus according to claim 26, wherein the length of the first conducting layer is approximately $\lambda/4$ measured from the conducting edge portion, where $\lambda$ is the wavelength, in the dielectric material, of EM radiation at the frequency of operation v.

28. Apparatus according to claim 26, wherein the second conducting side wall has a continuous length measured from the conducting base portion which is at least as long as the length of the first conducting side wall.

29. Apparatus according to claim 1, wherein the total thickness of the component is less than $\lambda/4$, or $\lambda/10$, or $\lambda/300$ or $\lambda/1000$, where $\lambda$ is the intended wavelength of operation at said first frequency.

30. Apparatus according to claim 1, wherein the total thickness of the component or is 1 mm or less, or 500 µm or less, or 100 µm or less.

31. Apparatus according to claim 1, wherein one of the conductor layers forms part, or substantially all of a metallic body.

* * * * *